(12) United States Patent
Liu (10) Patent No.: US 10,181,895 B2
(45) Date of Patent: Jan. 15, 2019

(54) FREE SPACE LASER AND MILLIMETRE WAVE(MMW) NETWORK FOR AIRBORNE RELAY NETWORKS

(71) Applicant: Honeywell International Inc., Morristown, NJ (US)

(72) Inventor: Xiaochen Liu, Beijing (CN)

(73) Assignee: Honeywell International Inc., Morris Plains, NJ (US)

( * ) Notice: Subject to any disclaimer, the term of this patent is extended or adjusted under 35 U.S.C. 154(b) by 660 days.

(21) Appl. No.: 14/476,835

(22) Filed: Sep. 4, 2014

(65) Prior Publication Data
US 2016/0285541 A1    Sep. 29, 2016

(51) Int. Cl.
  *H04B 10/50*  (2013.01)
  *H04B 7/185*  (2006.01)
  *H04B 10/112* (2013.01)

(52) U.S. Cl.
  CPC ....... *H04B 7/18506* (2013.01); *H04B 7/1851* (2013.01); *H04B 10/1123* (2013.01); *H04B 10/503* (2013.01)

(58) Field of Classification Search
  CPC .............. H04B 7/18506; H04B 7/1851; H04B 10/1123; H04B 10/503
  USPC ......... 370/254; 398/115, 116, 118, 122–125, 398/128–131
  See application file for complete search history.

(56) References Cited

U.S. PATENT DOCUMENTS

| 6,285,878 | B1 |   | 9/2001 | Lai |             |
|-----------|----|---|--------|-----|-------------|
| 6,347,001 | B1 | * | 2/2002 | Arnold | H04B 10/118 |
|           |    |   |        |     | 398/122     |
| 7,069,147 | B2 | * | 6/2006 | Manfred | G01W 1/08 |
|           |    |   |        |     | 340/971     |
| 7,680,516 | B2 | * | 3/2010 | Lovberg | H04B 1/38 |
|           |    |   |        |     | 455/431     |

(Continued)

FOREIGN PATENT DOCUMENTS

| EP | 1058409    |       | 12/2000 |           |
|----|------------|-------|---------|-----------|
| EP | 2879312 A1 | *     | 6/2015  | B64D 39/00 |

OTHER PUBLICATIONS

Krill et al., "Hybrid RF Network & Free Space Optical Communications", 2011, pp. 1-12, Publisher: The Johns Hopkins University Applied Physics Laboratory.

(Continued)

*Primary Examiner* — Amritbir K Sandhu
(74) *Attorney, Agent, or Firm* — Fogg & Powers LLC (57) ABSTRACT

An aircraft system comprises a first and second transceiver each configured to transmit and receive radio signals in respective first millimeter wave (mmW) frequency band and second mmW frequency band; and a processing unit configured to provide the data signals to the first and second transceivers for transmission and to receive demodulated signals from the first and second transceivers. The processing unit is further configured to output signals to alter the orientation of the first antenna to establish a first point-to-point connection with a first aircraft and to output signals to alter the orientation of the second antenna to establish a second point-to-point connection with a second aircraft; the first point-to-point connection and the second point-to-point connection forming part of a point-to-point aircraft relay ring network communicatively coupling a plurality of aircraft in a shared flight route area to each other.

20 Claims, 3 Drawing Sheets

(56) References Cited

U.S. PATENT DOCUMENTS

| | | | | |
|---|---|---|---|---|
| 7,965,225 B1* | 6/2011 | Dickerson | G01S 7/4026 | 342/73 |
| 8,223,062 B2* | 7/2012 | Bunch | H04B 7/18506 | 342/26 B |
| 8,600,587 B1* | 12/2013 | Seah | G08G 5/045 | 701/10 |
| 9,304,198 B1* | 4/2016 | Doerry | G01S 13/88 | |
| 9,535,158 B1* | 1/2017 | Breiholz | G01S 13/953 | |
| 9,607,447 B2* | 3/2017 | Gremmert | G07C 5/008 | |
| 9,921,314 B2* | 3/2018 | Jakel | G01S 19/07 | |
| 9,949,201 B2* | 4/2018 | Wang | H04W 4/30 | |
| 9,952,310 B2* | 4/2018 | Wang | G01S 13/951 | |
| 9,953,541 B2* | 4/2018 | Kuttappan | G08G 5/025 | |
| 9,967,707 B2* | 5/2018 | Esposito | H04B 7/155 | |
| 2003/0071743 A1* | 4/2003 | Seah | B64C 1/1469 | 340/945 |
| 2004/0037566 A1* | 2/2004 | Willebrand | H04B 10/1123 | 398/115 |
| 2004/0078136 A1* | 4/2004 | Cornell | G01W 1/00 | 701/120 |
| 2005/0108374 A1* | 5/2005 | Pierzga | H04B 7/18504 | 709/223 |
| 2007/0208465 A1* | 9/2007 | Gremmert | G05D 1/0607 | 701/4 |
| 2008/0102814 A1* | 5/2008 | Chari | H01Q 1/283 | 455/424 |
| 2009/0092074 A1* | 4/2009 | Jamalipour | H04B 7/18506 | 370/316 |
| 2009/0103452 A1* | 4/2009 | Horvath | H04B 7/18506 | 370/254 |
| 2009/0141669 A1* | 6/2009 | Kauffman | H04W 40/246 | 370/328 |
| 2009/0318138 A1* | 12/2009 | Zeng | H04B 7/18506 | 455/431 |
| 2010/0245164 A1* | 9/2010 | Kauffman | G01S 7/22 | 342/26 B |
| 2010/0332056 A1* | 12/2010 | Kirk | G01W 1/04 | 701/14 |
| 2011/0274429 A1* | 11/2011 | Caplan | H04B 10/5561 | 398/65 |
| 2012/0308235 A1* | 12/2012 | Pusarla | H04B 10/1121 | 398/79 |
| 2013/0080839 A1* | 3/2013 | Gin | G06F 11/3636 | 714/45 |
| 2013/0147652 A1* | 6/2013 | Haque | G08G 5/0008 | 342/21 |
| 2013/0242864 A1* | 9/2013 | Vermande | H04B 7/18506 | 370/328 |
| 2013/0315604 A1* | 11/2013 | Lopresti | H04B 10/1123 | 398/116 |
| 2013/0321201 A1* | 12/2013 | Savoy | G01S 19/15 | 342/357.3 |
| 2014/0197982 A1* | 7/2014 | Wang | G08G 5/0008 | 342/37 |
| 2014/0248049 A1* | 9/2014 | Saint Georges | H04B 10/1125 | 398/25 |
| 2014/0266896 A1* | 9/2014 | Hyslop | H04B 7/18506 | 342/368 |
| 2014/0333491 A1* | 11/2014 | Behroozi | H01Q 1/1264 | 343/706 |
| 2015/0109181 A1* | 4/2015 | Hyde | H01Q 15/0053 | 343/833 |
| 2015/0249498 A1* | 9/2015 | Minguez Rascon | B64D 39/00 | 244/135 A |
| 2015/0280812 A1* | 10/2015 | Jalali | H04W 40/22 | 455/431 |
| 2015/0310747 A1* | 10/2015 | Frolik | B64D 45/00 | 340/971 |

OTHER PUBLICATIONS

"ViaLight Communications: Laser Communications for Aerial Applications", 2013, pp. 1-16.
"AOptix Intellimax", 2013, pp. 1-4, Publisher: AOptix Technologies, Inc.

* cited by examiner

FREE SPACE LASER AND MILLIMETRE WAVE(MMW) NETWORK FOR AIRBORNE RELAY NETWORKS

BACKGROUND

The demand for more airborne high speed data connections has increased. For example, demand for in-flight broadband internet service has increased on commercial and business aircraft. Conventional communication techniques may not be able to provide the necessary bandwidth and access to meet the increasing demands for high speed data connections.

SUMMARY

In one embodiment, an aircraft system is provided. The aircraft system comprises a first transceiver configured to transmit and receive radio signals in a first millimeter wave (mmW) frequency band via a first antenna; a second transceiver configured to transmit and receive radio signals in a second mmW frequency band via a second antenna; and a processing unit configured to provide the data signals to the first and second transceivers for transmission and to receive demodulated signals from the first and second transceivers. The processing unit is further configured to output signals to alter the orientation of the first antenna to establish a first point-to-point connection with a first aircraft and to output signals to alter the orientation of the second antenna to establish a second point-to-point connection with a second aircraft; the first point-to-point connection and the second point-to-point connection forming part of a point-to-point aircraft relay ring network communicatively coupling a plurality of aircraft in a shared flight route area to each other.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Figure 1:
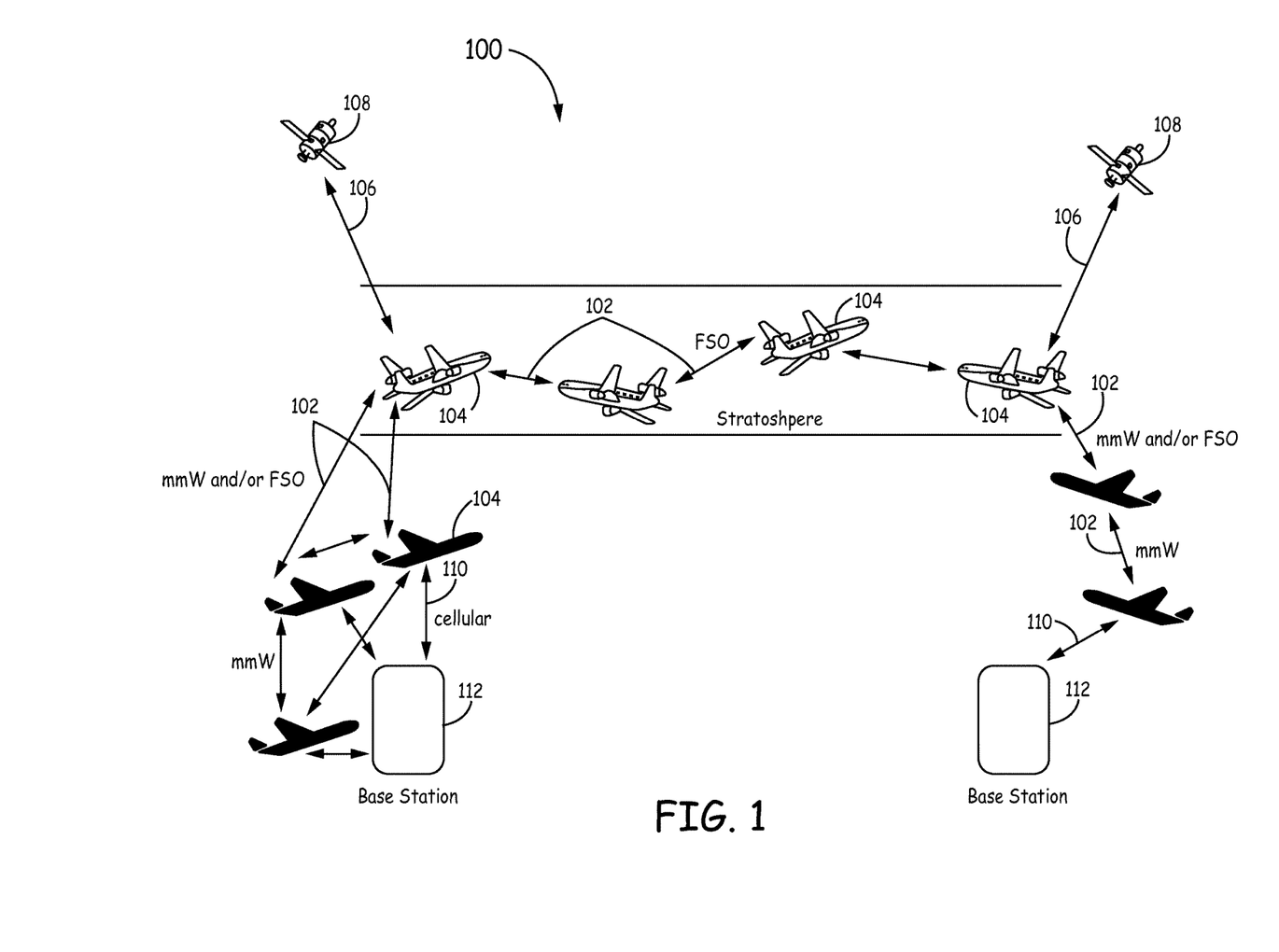
FIG. 1 depicts one embodiment of an exemplary aircraft network utilizing Free Space Laser and Millimeter Wave links.

FIG. 1 depicts one embodiment of an exemplary aircraft relay network 100. In the aircraft network 100, links 102 between aircraft 104 are implemented as at least one of Free Space Laser links, also referred to herein as Free Space Optical (FSO) links, or millimeter wave (mmW) links. Thus, links 102 are directional point-to-point links as opposed to broadcast communications between aircraft as in conventional aircraft relay networks. As used herein, the terms "link" and "connection" can be used interchangeably. A mmW link is defined to mean a link implemented using an extremely high frequency (EHF) (e.g. approximately 30 GHz to 300 GHz). For example, some exemplary frequency ranges include, but are not limited to, 38.6-40.0 GHz, 71-76 GHz, 81-86 GHz and 92-95 GHz bands. The use of mmW links and/or FSO links provides the potential for higher bandwidth and throughput for data being transmitted from the aircraft than is available via conventional communication techniques. For example, the use of mmW links and/or FSO links can provide more bandwidth for meeting increasing demands for in-flight internet services.

In the example shown in FIG. 1, some links 102 are implemented only as mmW links, some links 102 are implemented only as FSO links, and other links 102 are implemented as a mmW and/or an FSO link. For example, links 102 between aircraft flying below the stratosphere (e.g. below approximately 30,000 feet in altitude) are implemented as mmW links and links 102 between aircraft flying within the stratosphere are implemented only as FSO links, in the example embodiment of FIG. 1. Links 102 between an aircraft in the stratosphere and an aircraft below the stratosphere are implemented as an FSO link and/or a mmW link in the example of FIG. 1. It is to be understood, however, that in other embodiments, other configurations of links 102 are used. For example, in some embodiments, all links 102 are implemented as mmW links. In other embodiments, all links 102 are implemented as FSO links. In yet other embodiments, each link 102 is implemented using both an FSO link and a mmW link in order to provide link diversity. Thus, FIG. 1 is provided by way of example only.

Each aircraft 104 in the aircraft relay network 100 is traveling within the same flight route area. As used herein, a flight route area is a geographic area through which a flight route passes. At least a portion of more than one flight route may pass through the same geographic flight route area. For example, in between two large cities, such as Shanghai and Beijing, are located other airports corresponding to other cities along a flight route between Shanghai and Beijing. Thus, flights between those intermediate cities as well as flights between or to Shanghai or Beijing and one of the intermediate cities will all travel in the same geographic flight route area for at least a portion of their respective flight routes. The same is true for flight route areas between other large cities. As a result, such flight route areas are typically considered crowded or busy due to the large number of aircraft traveling in the same geographic area. For example, in some embodiments, the distance between any given aircraft in the flight route area is approximately 50-100 kilometers.

This relatively close distance between aircraft 104 in the same flight route area is conducive to the use of FSO and/or mmW point-to-point links 102. In particular, each aircraft 104 is able to establish a point-to-point link with an aircraft in front of it and behind it. Thus, the aircraft network 100 forms an ad-hoc ring network as opposed to an ad-hoc mesh network, as in conventional aircraft relay networks.

In addition, in this embodiment, network 100 includes links 106 between an aircraft 104 and a satellite 108. In this embodiment, links 106 are implemented using an FSO link. Links 106 can be used as back-up for communication with the ground in case a link 102 between aircraft is not available. For example, weather conditions can degrade the signal quality of an FSO link as well as a mmW link. Hence, each aircraft 104 is capable of connecting to a satellite 108 via a respective link 106 using conventional techniques and/or via an FSO link. FIG. 1 also includes links 110 between an aircraft 104 and a ground station 112. In this embodiment, links 110 are implemented using a broadcast link, such as cellular communication. However, it is to be understood that links 110 can be implemented using an FSO or mmW link in other embodiments.

As noted above, weather conditions can affect the FSO and mmW links. For example, changes in the weather conditions, such as a rain storm, can affect the data rate and/or other parameters of the links 102, such as, but not limited to, linear depolarization ratio (LDR), special differential phase, zero delay correlation variable, etc. In some embodiments, a system on each aircraft 104 is configured to compare the parameters of signals received on a given link 102 to a weather model in order to determine the weather conditions of the area through which the signals passed. For example, an aircraft system can analyze signals received on a link 102 ahead of the aircraft to determine weather conditions ahead of the aircraft.

Such analysis can include, but is not limited to, monitoring certain parameters, such as bit error rate (BER) or phase change, while changing the modulation scheme and/or beam type (e.g. Gaussian, optical vortex, or hybrid Gaussian-optical vortex). Exemplary modulation schemes include, but are not limited to, intensity modulation, frequency modulation, phase modulation, polarization of light, orbital angular momentum (OAM), etc. Different modulation schemes perform differently based on the atmospheric conditions. For example, one modulation scheme might have low BER for certain atmospheric conditions, whereas another modulation scheme might have higher BER for the same atmospheric conditions.

In some embodiments, each modulation scheme is associated with one or more special character bits. The one or more special character bits associated with the specific modulation scheme are transmitted over the link 102 to monitor changes in link parameters. By comparing the measured results, such as data loss pattern, from different modulation schemes with an empirical model stored in a database, the weather pattern or atmospheric conditions can be detected. Thus, by monitoring how the parameters change for the transmitted character bit due to changes in the modulation scheme, weather conditions can be predicted, such as Clean Air Turbulence (CAT), foggy, rainy, etc. Some conditions, such as CAT, are difficult to detect with conventional weather radar. Thus, the use of the links 102 to provide detection of such conditions improves weather detection abilities.

In addition, the aircraft system can send the weather data and/or the link parameters to other aircraft via the links 102. In some embodiments, the weather data is given a higher priority than non-critical communications. In particular, non-critical communications are communications that are not necessary for operation of the aircraft. For example, passenger in-flight internet access is a non-critical communication. Critical communications are communications necessary for operation of the aircraft, such as, but not limited to, communications with an Air Traffic Controller. Hence, in some embodiments, the weather data is given priority over non-critical communications for access to the bandwidth of the links 102.

The weather data and/or the link parameters can also be relayed to a ground station 112 via the links 102 of the aircraft relay network 102. The weather data received at one or more ground stations 112 from a plurality of aircraft 104 can be used in predicting or forecasting weather. In addition, the weather data can be used in determining if adjustments to a flight route should be undertaken. Furthermore, each aircraft 104 can use the weather data to adjust the control information for controlling the FSO or mmW communication equipment. For example, the modulation scheme or beam type can be adjusted to improve performance for specific detected atmospheric conditions.

The aircraft 104 connected via links 102 behave similar to nodes in peer-to-peer network. That is, none of the aircraft 104 acts as a control or master node. Each aircraft 104 dynamically allocates the throughput rate according to priority and need. For example, each aircraft can preserve bandwidth for weather detection, relaying data in the network, "handshake" process for establishing links 102, etc. In addition, the mmW transceiver and FSO laser can be utilized together to ensure a specified quality of service for critical services. In addition, in some embodiments, a ground unit can be configured as a control unit to manage the whole network 100. For example, the ground unit can direct sharing weather information or transmitting critical information, such as when the aircraft has technical problems or a passenger is in danger, with elevated priority to ensure a higher data rate. Thus, network 100 functions as both a communication network and a weather condition detector/weather alarm network along the entire flight route area. The weather alarm data can help pilots flying in the flight route area find better or safer routes to their respective destinations.

Figure 2:
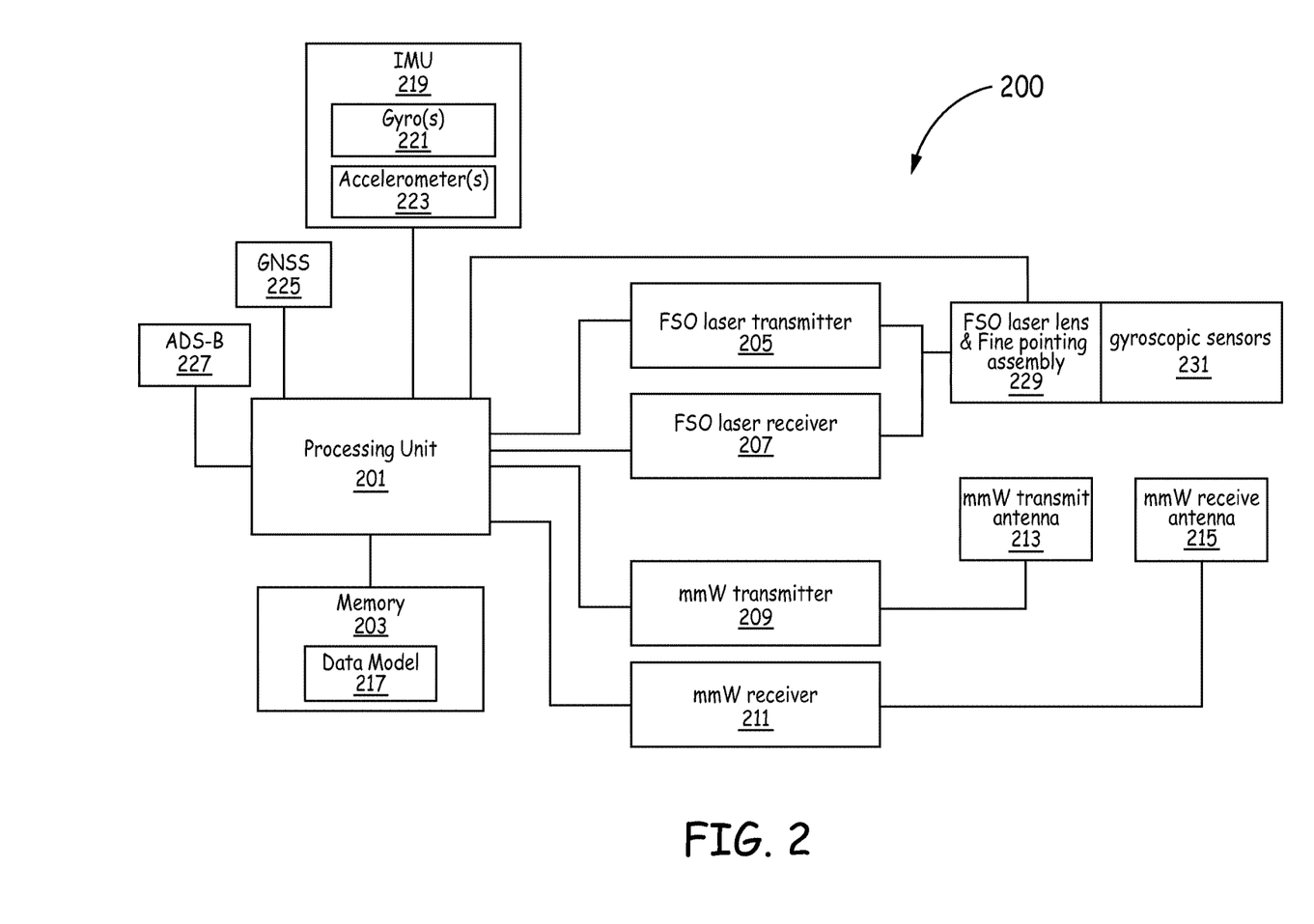
FIG. 2 is high level block diagram depicting one embodiment of an exemplary aircraft system.

FIG. 2 is a block diagram of an exemplary aircraft system 200 on board an aircraft, such as one of the aircraft 104 in network 100. In some embodiments, at least a portion of the aircraft system 200 is located or mounted on the vertical tail of the aircraft. For example, a respective antenna or transceiver can be located in the vertical tail of the aircraft. The aircraft system 200 includes a processing unit 201, a memory 203, an FSO laser transmitter 205, an FSO laser receiver 207, a mmW transmitter 209, a mmW receiver 211, a mmW transmit antenna 213, and a mmW receive antenna 215. It should be noted that the FSO laser transmitter 205 and the FSO laser receiver 207 are described as separate physical devices for purposes of explanation. However, it is to be understood that the FSO laser transmitter 205 and the FSO laser receiver 207 can be implemented in a single physical unit, commonly referred to as a transceiver. Similarly, the mmW transmitter 209 and the mmW receiver 211 can be implemented in a single physical transceiver unit. In addition, it is to be understood that more than one FSO transmitter, more than one FSO receiver, more than one mmW transmitter, and/or more than one mmW receiver can be implemented in other embodiments. For example, each aircraft system 200 can include two FSO transceivers and/or two mmW transceivers: one for communication with an aircraft in front of the aircraft system 200 and one for communication with an aircraft behind the aircraft system 200.

The FSO laser transmitter 205 is configured to transmit an optical signal based on data received from the processing unit 201. The FSO laser receiver 207 is configured to demodulate a received optical signal and convert the optical signal to an electrical signal. The electrical signal is then provided to the processing unit 201 for processing. Similarly, the mmW receiver 211 is configured to demodulate signals received via the mmW receive antenna 215 and provide the demodulated signals to the processing unit 201. The mmW transmitter 209 and the mmW receiver 211 are also referred to herein together as the mmW transceiver. It is also to be understood that although a separate mmW receive antenna 215 and mmW transmit antenna 213 are described in this embodiment, the same antenna can be used for both transmission and reception, in other embodiments.

The processing unit 201 determines if the signals contain data for use by another component on the aircraft, such as but not limited to, a Communication Management Unit (CMU)/Communication Management Function (CMF), Flight Management Computer (FMC), Central Maintenance Computer (CMC), Aircraft Condition Monitoring System (ACMS), etc. In addition, the processing unit 201 determines if the signal contains data to be forwarded to another aircraft. Data to be forwarded is then provided to one or both of the FSO laser transmitter 205 and mmW transmitter 209. In some embodiments, the memory 203 is implemented as a buffer for temporarily storing data to be relayed to other aircraft. The forwarded data as well as data originating on the aircraft can be transmitted via the mmW transmit antenna 213 and/or the FSO laser transmitter 205.

In addition, the processing unit 201 is configured to compare characteristics, such as data rate, of signals received over the mmW and/or free space laser connection to a data model 217 stored in memory 203. The data model 217 includes relationships between the signal characteristics and weather conditions. Such relationships can be identified, for example, through empirical studies. Thus, by comparing the characteristics of the received signals, the processing unit 201 is able to determine weather conditions of the geographic area through which the signals passed, as discussed above. The determined weather conditions can be stored in memory 203 and/or forwarded to other aircraft components. For example, the information can be provided to a display for a pilot to review. In addition, the determined weather conditions can be sent via one or both of the FSO transmitter 205 and mmW transmitter 209 to be forwarded to other aircraft. In addition, the determined weather conditions can be forwarded via the aircraft relay network to a ground station where it can be combined with weather conditions from other aircraft to aid in predicting weather patterns for aircraft.

The aircraft system 200 also includes other sensors, such as those in an inertial measurement unit 219 comprising one or more gyroscopes 221 and one or more linear accelerometers 223. The gyroscopes 221 and accelerometers 223 are used to determine the orientation and heading of the aircraft. The orientation and heading information is provided to the processing unit 201. The processing unit 201 uses the heading and orientation information to aid in aligning the FSO laser lens assembly 229 coupled to the FSO laser transmitter 205/FSO laser receiver 207 (also referred to herein together as FSO transceiver) and/or the mmW transmit antenna 213/mmW receive antenna 215 to establish respective point-to-point links with other aircraft.

For example, the heading and orientation information can be used by the processing unit 201 to output signals to orient the FSO laser lens assembly 229 coupled to the FSO laser transmitter 205 and the FSO laser receiver 207 to establish respective point-to-point connections with another FSO transceiver, such as an FSO transceiver in a satellite or another aircraft. In addition, in some embodiments, the aircraft system 200 includes other navigation sensors, such as a Global Navigation System Sensor (GNSS) 225 and Automatic Dependent Surveillance-Broadcast (ADS-B) equipment 227, which can also provide data for use in orienting or aligning the FSO laser transmitter 205/FSO laser receiver 207 and/or the mmW transmit antenna 213/mmW receive antenna 215 (also referred to herein together as mmW transceiver) to establish respective point-to-point links with aircraft in front of and behind the aircraft on which the aircraft system 200 is located.

In one embodiment, ADS-B data regarding one or more target aircraft in the flight route area is received via ADS-B equipment 227. The processing unit 201 compares the ADS-B data with the current position information obtained from GNSS 225. Based on the ADS-B data and GNSS location information, the processing unit 201 is able to determine factors used in selecting which aircraft to use for establishing a link. For example, the determined factors can include, but are not limited to, distance between the aircraft system 200 and each of the other aircraft, average speed of each of the other aircraft, altitude of each of the other aircraft, orientation of each of the aircraft, destination of each of the other aircraft. In addition, the processing unit 201 can determine which of the other aircraft has an FSO transceiver and/or mmW transceiver. The processing unit 201 then selects one of the other aircraft based on one or more of the above factors. For example, the desired target aircraft is one with the same direction as the aircraft system 200, similar speed, similar flight route, suitable altitude, close distance to the aircraft system 200, etc. The ADS-B and GNSS data is also used to provide a coarse estimate of how to adjust the FSO laser transmitter 205/FSO laser receiver 207 and/or the mmW transmit antenna 213/mmW receive antenna 215.

The mmW transmitter 209 and receiver 211 (or other data link communication equipment, such as VHF radio) are used to negotiate establishing a link with the corresponding equipment in the target aircraft. When connecting to equipment in a target aircraft that is in front of or ahead of the aircraft system 200, the mmW transceiver and/or the FSO transceiver of the aircraft system 200 becomes the master unit and directs the corresponding equipment on the target aircraft how to adjust its corresponding antenna or lens. When connecting to equipment in a target aircraft behind the aircraft system 200, the equipment in the target aircraft becomes the master and directs the corresponding mmW transceiver or FSO transceiver in the aircraft system 200 how to be adjusted in order to establish the communication link.

During the initial coarse alignment, the processing unit 201 provides control signals to the mmW transceiver or FSO transceiver to align the respective antenna or lens. After performing the coarse alignment, the mmW transceiver communicates with the corresponding equipment on the target aircraft to exchange accurate target position, target gyro data, target accelerometer data, etc. After getting dynamic position and IMU data from IMU 219 as well as data from the target aircraft, the processing unit sends fine tune control signal to the FSO laser lens and fine pointing assembly 229. In particular, based in part on the exchanged data and weather conditions, such as air density, the processing unit 201 determines a desired angle of incidence for the FSO link. The processing unit 201 then sends control signals to the FSO laser lens and fine pointing assembly 229 to adjust the angle of the lens approximately to the desired angle. In addition, the FSO laser lens is adjust so that laser beams are transmitted and received away from the nose of the aircraft to reduce potential harm to a pilot's eyes. The FSO laser lens assembly 229 may experience large vibrations during flight. The gyroscopic sensors 231 detect the vibrations and help reduce the vibration experienced by the FSO laser lens assembly 229 similar to an optical image stabilizer known to one of skill in the art. In addition, in some embodiments, an active pixel array or other technology is used to sense the position drift on the FSO laser lens assembly 229 and compensate for it.

The processing unit 201 is also configured to track and lock the correct orientation of the respective devices to maintain the point-to-point links as the respective aircraft travel. It is to be understood that system 200 is provided by way of example only. In particular, other components not shown can be included in other embodiments and/or some components in FIG. 2 can be omitted. For example, in some embodiments, the aircraft system 200 does not include an FSO laser transmitter 207 and FSO laser receiver 205. In yet other embodiments, the aircraft system 200 does not include a mmW transmitter 209 and mmW receiver 211.

Figure 3:
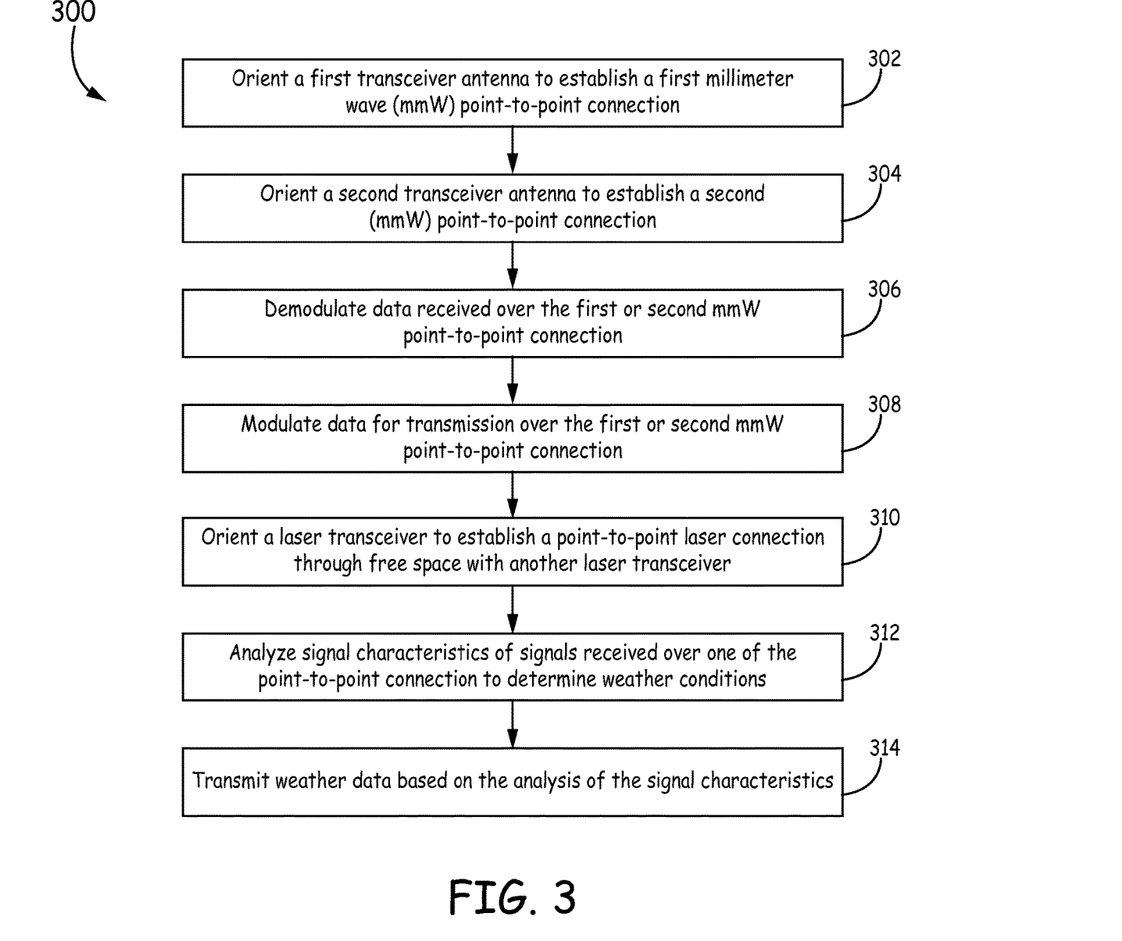
FIG. 3 is a flow chart depicting one embodiment of an exemplary method of communicating data in an aircraft network.

FIG. 3 is a flow chart depicting a method 300 of communicating data through an aircraft relay network. At block 302, a first transceiver antenna is oriented on a first aircraft to establish a first millimeter wave (mmW) point-to-point connection with a second aircraft. For example, the first transceiver antenna can be oriented based on measurements from sensors, such as a gyroscope, onboard the first aircraft and data obtained from the second aircraft, such as ADS-B data, as described above. In addition, control signals can be sent from the first aircraft to the second aircraft to orient corresponding equipment on the second aircraft in order to establish the first mmW point-to-point connection. At block 304, a second transceiver antenna on the first aircraft is oriented to establish a second mmW point-to-point connection with a third aircraft. For example, the second transceiver antenna can be oriented based on control signals received from the third aircraft, as discussed above. The first mmW point-to-point connection and the second mmW point-to-point connection form part of a point-to-point aircraft relay ring network communicatively coupling aircraft together. At block 306, data received over the first and/or second mmW point-to-point connection is demodulated. At block 308, data for transmission over the first and/or second mmW point-to-point connection is modulated. At block 310, a laser transceiver is oriented to establish a point-to-point laser connection through free space with another laser transceiver. For example, in some embodiments, the other laser transceiver is located in a satellite. In other embodiments, the other laser transceiver is located in another aircraft in the same flight route area as the first aircraft. In addition, in some embodiments, data is only transmitted to other aircraft in the stratosphere via the point-to-point laser connection At block 312, signal characteristics of signals received over the first and/or second mmW point-to-point connection and/or the free space point-to-point laser connection are analyzed to determine weather conditions of the area through which the received signals passed. At block 314, weather data based on the analysis of the signal characteristics is transmitted to one of the second aircraft or the third aircraft via the first mmW point-to-point connection, the second mmW point-to-point connection, or the free space point-to-point laser connection. In some embodiments, the weather data is assigned a higher priority than non-critical communications for transmission over the first mmW point-to-point connection.

Example Embodiments

Example 1 includes an aircraft system comprising: a first transceiver configured to transmit and receive radio signals in a first millimeter wave (mmW) frequency band via a first antenna; a second transceiver configured to transmit and receive radio signals in a second mmW frequency band via a second antenna; a processing unit configured to provide the data signals to the first and second transceivers for transmission and to receive demodulated signals from the first and second transceivers; wherein the processing unit is further configured to output signals to alter the orientation of the first antenna to establish a first point-to-point connection with a first aircraft and to output signals to alter the orientation of the second antenna to establish a second point-to-point connection with a second aircraft; the first point-to-point connection and the second point-to-point connection forming part of a point-to-point aircraft relay ring network communicatively coupling a plurality of aircraft in a shared flight route area to each other.

Example 2 includes the aircraft system of Example 1, wherein the processing unit is further configured to analyze signal characteristics of signals received via the receiver to determine weather conditions of the area through which the received signals passed.

Example 3 includes the aircraft system of Example 2, wherein the processing unit is configured to transmit weather data regarding the determined weather conditions to the first aircraft via the transmitter.

Example 4 includes the aircraft system of Example 3, wherein the weather data is assigned a higher priority than non-critical communications.

Example 5 includes the aircraft system of any of Examples 1-4, further comprising an inertial management unit having at least one gyroscope; wherein the processing unit is configured to use measurements from the at least one gyroscope to determine the orientation of the transmit antenna and the receive antenna for establishing the respective point-to-point connections.

Example 6 includes the aircraft system of any of Examples 1-5, further comprising: a free space optical (FSO) transmitter configured to transmit an optical signal through free space; and an FSO receiver configured to receive an optical signal through free space; wherein the processing unit is configured to output signals to alter the orientation of the FSO transmitter and FSO receiver in order to establish a point-to-point laser connection with another FSO transceiver.

Example 7 includes the aircraft system of Example 6, wherein the FSO transmitter and the FSO receiver establish a point-to-point connection with an FSO transceiver in a satellite.

Example 8 includes a point-to-point aircraft relay ring network comprising: a plurality of aircraft flying in a flight route area; and one or more ground stations communicatively coupled to one or more of the plurality of aircraft; wherein each of the plurality of aircraft includes an aircraft system comprising: a receive antenna configured to receive radio signals in a first millimeter wave (mmW) frequency band; a receiver configured to demodulate radio signals received via the receive antenna; a transmitter configured to modulate data signals for transmission; a transmit antenna configured to direct radiated radio signals in a second mmW frequency band; a processing unit configured to provide the data signals to the transmitter for transmission via the transmit antenna and to receive the demodulated signals from the receiver; wherein the processing unit is further configured to output signals to alter the orientation of the transmit antenna to establish a first point-to-point connection with a respective first aircraft from the plurality of aircraft in the flight route area; wherein the processing unit is further configured to output signals to alter the orientation of the receive antenna to establish a second point-to-point connection with a respective second aircraft from the plurality of aircraft in the flight route area; wherein the first point-to-point connection and the second point-to-point connection form part of the point-to-point aircraft relay ring network communicatively coupling the plurality of aircraft together; wherein the processing unit in the aircraft system of at least one of the plurality of aircraft is configured to analyze signal characteristics of signals received via the respective receiver to determine weather conditions of the area through which the received signals passed.

Example 9 includes the aircraft relay network of Example 8, wherein the processing unit is further configured to analyze signal characteristics of signals received via the receiver to determine weather conditions of the area through which the received signals passed.

Example 10 includes the aircraft relay network of Example 9, wherein the processing unit in the at least one aircraft is configured to transmit weather data regarding the determined weather conditions to the respective first aircraft via the transmitter.

Example 11 includes the aircraft relay network of Example 10, wherein the processing unit in the at least one aircraft is configured to transmit the weather data with a higher priority than non-critical communications.

Example 12 includes the aircraft relay network of any of Examples 8-11, wherein the aircraft system in each of the plurality of aircraft further comprises an inertial management unit having at least one gyroscope; wherein the processing unit in the aircraft system of each of the plurality of aircraft is configured to use measurements from the at least one gyroscope to determine the orientation of the transmit antenna and the receive antenna for establishing the respective point-to-point connections.

Example 13 includes the aircraft relay network of any of Examples 8-12, wherein the aircraft system in each of the plurality of aircraft further comprises: a free space optical (FSO) transmitter configured to transmit an optical signal through free space; and an FSO receiver configured to receive an optical signal through free space; wherein the processing unit is configured to output signals to alter the orientation of the FSO transmitter and FSO receiver in order to establish a point-to-point connection with another FSO transceiver Example 14 includes the aircraft relay network of Example 13, further comprising one or more satellites; wherein the FSO transmitter and the FSO receiver in one or more of the plurality of aircraft is configured to establish a point-to-point connection with an FSO transceiver in one of the one or more satellites.

Example 15 includes a method of communicating data through an aircraft relay network, the method comprising: orienting a transmit antenna on a first aircraft to establish a first millimeter wave (mmW) point-to-point connection with a second aircraft; orienting a receive antenna on the first aircraft to establish a second mmW point-to-point connection with a third aircraft, the first mmW point-to-point connection and the second mmW point-to-point connection forming part of a point-to-point aircraft relay ring network communicatively coupling aircraft together; demodulating data received over the second mmW point-to-point connection; and modulating data for transmission over the first mmW point-to-point connection.

Example 16 includes the method of Example 15 further comprising: analyzing signal characteristics of signals received over the second mmW point-to-point connection to determine weather conditions of the area through which the received signals passed.

Example 17 includes the method of Example 16, further comprising transmitting weather data based on the analysis of the signal characteristics to the second aircraft via the first mmW point-to-point connection.

Example 18 includes the method of Example 17, wherein transmitting the weather data comprises transmitting the weather data with a higher priority than non-critical communications.

Example 19 includes the method of any of Examples 15-18, further comprising: orienting a laser transceiver to establish a point-to-point laser connection through free space with another laser transceiver.

Example 20 includes the method of any of Examples 15-19, wherein orienting the transmit antenna comprises orienting the transmit antenna based on measurements from a gyroscope onboard the first aircraft; and wherein orienting the receive antenna comprises orienting the receive antenna based on measurements from the gyroscope onboard the first aircraft.

Example 21 includes an aircraft system comprising a free space optical (FSO) transmitter configured to transmit optical signals through free space; an FSO receiver configured to receive optical signals through free space and convert the optical signals to electrical signals; a processing unit configured to provide the data signals to the FSO transmitter for transmission and to receive the electrical signals from the FSO receiver; wherein the processing unit is configured to output signals to alter the orientation of the FSO transmitter and FSO receiver in order to establish a point-to-point laser connection with another FSO transceiver located on another aircraft.

Example 22 includes the aircraft system of Example 21, further comprising: a first transceiver configured to transmit and receive radio signals in a first millimeter wave (mmW) frequency band via a first antenna; and a second transceiver configured to transmit and receive radio signals in a second mmW frequency band via a second antenna; wherein the processing unit is further configured to output signals to alter the orientation of the first antenna to establish a first point-to-point connection with a first aircraft and to output signals to alter the orientation of the second antenna to establish a second point-to-point connection with a second aircraft; the first point-to-point connection and the second point-to-point connection forming part of a point-to-point aircraft relay ring network communicatively coupling a plurality of aircraft in a shared flight route area to each other.

Example 23 include the aircraft system of any of Examples 21-22, wherein the processing unit is further configured to analyze signal characteristics of optical signals received via the FSO receiver to determine weather conditions of the area through which the received optical signals passed.

Example 24 includes the aircraft system of any of Examples 21-23, wherein the FSO transmitter and the FSO receiver are configured to establish a point-to-point connection with an FSO transceiver in a satellite.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An aircraft system comprising:
a first transceiver configured to transmit and receive radio signals in a first millimeter wave (mmW) frequency band via a first antenna;
a second transceiver configured to transmit and receive radio signals in a second mmW frequency band via a second antenna;
a processing unit coupled to the first transceiver and the second transceiver;
wherein the processing unit is configured to provide data signals to the first and the second transceivers for transmission and to receive demodulated signals from the first and second transceivers;
wherein the processing unit is further configured to output signals to alter orientation of the first antenna through which to establish a first point-to-point connection with a first aircraft and to output signals to alter orientation of the second antenna through which to establish a second point-to-point connection with a second aircraft; the first point-to-point connection and the second point-to-point connection forming part of a point-to-point aircraft relay ring network communicatively coupling a plurality of aircraft in a shared flight route area to each other; and
wherein the processing unit is further configured to compare characteristics of signals, received from the second aircraft via the second transceiver, with a model relating signal characteristics to weather to determine weather conditions of an area through which the received signals passed.

2. The aircraft system of claim 1, wherein the processing unit is further configured to transmit weather data regarding the determined weather conditions to the first aircraft via the first transceiver.

3. The aircraft system of claim 2, wherein the weather data is assigned a higher priority than non-critical communications.

4. The aircraft system of claim 1, further comprising an inertial management unit having at least one gyroscope;
wherein the processing unit is further configured to use measurements from the at least one gyroscope to determine orientation of a transmit antenna and a receive antenna for establishing a respective point-to-point connections.

5. The aircraft system of claim 1, further comprising:
a free space optical (FSO) transmitter, coupled to the processing unit, configured to transmit a first optical signal through free space; and
an FSO receiver, coupled to the processing unit, configured to receive a second optical signal through the free space;
wherein the processing unit is further configured to output signals to alter orientation of the FSO transmitter and the FSO receiver in order to establish a point-to-point laser connection with a FSO transceiver.

6. The aircraft system of claim 5, wherein the processing unit is further configured to analyze signal characteristics of signals received via the FSO receiver to determine weather conditions of the area through which the received optical signals passed.

7. A point-to-point aircraft relay ring network comprising:
a plurality of aircraft flying in a flight route area;
one or more ground stations communicatively coupled to one or more of the plurality of aircraft;
wherein each of the plurality of aircraft includes an aircraft system comprising:
a receive antenna configured to receive radio signals in a first millimeter wave (mmW) frequency band;
a receiver configured to demodulate the radio signals received via the receive antenna;
a transmit antenna configured to direct radiated radio signals in a second mmW frequency band;
a transmitter configured to modulate data signals for transmission via the transmit antenna;
a processing unit coupled to the receiver and the transmitter;
wherein the processing unit is configured to provide the data signals to the transmitter for transmission via the transmit antenna and to receive demodulated signals from the receiver;
wherein the processing unit is further configured to output signals to alter orientation of the transmit antenna through which to establish a first point-to-point connection with a respective first aircraft from the plurality of aircraft in the flight route area;
wherein the processing unit is further configured to output signals to alter orientation of the receive antenna through which to establish a second point-to-point connection with a respective second aircraft from the plurality of aircraft in the flight route area;
wherein the first point-to-point connection and the second point-to-point connection form part of the point-to-point aircraft relay ring network communicatively coupling the plurality of aircraft together; and
wherein the processing unit is further configured to compare characteristics of signals, received from the second aircraft via the second transceiver, with a model relating signal characteristics to weather to determine weather conditions of an area through which the received signals passed.

8. The aircraft relay network of claim 7, wherein the processing unit in the at least one of the plurality of aircraft is configured to transmit weather data regarding the determined weather conditions to the respective first aircraft via the transmitter.

9. The aircraft relay network of claim 8, wherein the processing unit in the at least one of the plurality of aircraft is configured to transmit the weather data with a higher priority than non-critical communications.

10. The aircraft relay network of claim 7, wherein the aircraft system in each of the plurality of aircraft further comprises an inertial management unit having at least one gyroscope;
wherein the processing unit in the aircraft system of each of the plurality of aircraft is configured to use measurements from the at least one gyroscope to determine the orientation of the transmit antenna and the orientation of the receive antenna for establishing respective point-to-point connections.

11. The aircraft relay network of claim 7, wherein the aircraft system in each of the plurality of aircraft further comprises:
a free space optical (FSO) transmitter, coupled to the processing unit, configured to transmit a first optical signal through free space;

an FSO receiver, coupled to the processing unit, configured to receive a second optical signal through free space; and wherein the processing unit is further configured to output signals to alter the orientation of the FSO transmitter and FSO receiver in order to establish a point-to-point connection with another FSO transceiver.

12. The aircraft relay network of claim 11, wherein the processing unit is further configured to analyze signal characteristics of signals received via the FSO receiver to determine weather conditions of the area through which the received optical signals passed.

13. A method of communicating data through an aircraft relay network, the method comprising:
generating output signals configured to alter orientation of a transmit antenna through which to establish a first mmW point-to-point connection with a second aircraft, and configured to alter orientation of a receive antenna through which to establish a second point-to-point connection with a third aircraft;
orienting the transmit antenna on a first aircraft through which to establish the first millimeter wave (mmW) point-to-point connection with the second aircraft;
orienting the receive antenna on the first aircraft through which to establish the second mmW point-to-point connection with the third aircraft, the first mmW point-to-point connection and the second mmW point-to-point connection forming part of a point-to-point aircraft relay ring network communicatively coupling a plurality of aircraft together;
demodulating data received over the second mmW point-to-point connection;
modulating data for transmission over the first mmW point-to-point connection; and
comparing characteristics of signals, received from the third aircraft over the second mmW point-to-point connection, with a model relating signal characteristics to weather to determine weather conditions of an area through which the received signals passed.

14. The method of claim 13, further comprising transmitting weather data based on the analysis of the signal characteristics to the second aircraft via the first mmW point-to-point connection.

15. The method of claim 14, wherein transmitting the weather data comprises transmitting the weather data with a higher priority than non-critical communications.

16. The method of claim 13, further comprising:
orienting a laser transceiver to establish a point-to-point laser connection through free space with another laser transceiver.

17. The method of claim 13, wherein orienting the transmit antenna comprises orienting the transmit antenna based on measurements from a gyroscope onboard the first aircraft; and wherein orienting the receive antenna comprises orienting the receive antenna based on measurements from the gyroscope onboard the first aircraft.

18. An aircraft system comprising:
a first free space optical (FSO) transceiver configured to transmit and receive a first set of optical signals through free space and convert the first set of optical signals to a first set of electrical signals;
second FSO transceiver configured to transmit and receive a second set of optical signals through the free space and convert the second set of optical signals to a second set of electrical signals;
a processing unit coupled to the first FSO transceiver and the second FSO transceiver;
wherein the processing unit is configured to provide data signals to the first and the second FSO transceivers for transmission and to receive the electrical signals from the first and second FSO transceivers;
wherein the processing unit is further configured to output signals to alter orientation of at least one of the first and the second FSO transceivers or at least one of their respective lenses in order to establish a point-to-point laser connection between one of the first and second FSO transceivers, and another FSO transceiver located on an aircraft forming part of a point-to-point aircraft relay ring network communicatively coupling a plurality of aircraft in a shared flight route area to each other; and
wherein the processing unit is further configured to compare characteristics of signals, received from the aircraft via the first FSO transceiver, with a model relating signal characteristics to weather to determine weather conditions of an area through which the received signals passed.

19. The aircraft system of claim 18, further comprising:
a first transceiver configured to transmit and receive radio signals in a first millimeter wave (mmW) frequency band via a first antenna;
a second transceiver configured to transmit and receive radio signals in a second mmW frequency band via a second antenna; and
wherein the processing unit is further configured to output signals to alter orientation of the first antenna to establish a first point-to-point connection with a first aircraft and to output signals to alter orientation of the second antenna to establish a second point-to-point connection with a second aircraft; the first point-to-point connection and the second point-to-point connection forming part of the point-to-point aircraft relay ring network communicatively coupling the plurality of aircraft in the shared flight route area to each other.

20. The aircraft system of claim 18, wherein the first FSO transceiver is configured to establish a point-to-point connection with an FSO transceiver in a satellite.

* * * * *